United States Patent [19]

Tokunaga et al.

[11] Patent Number: 4,586,728
[45] Date of Patent: May 6, 1986

[54] VEHICLE SUSPENSION MEANS HAVING VARIABLE SUSPENSION CHARACTERISTICS

[75] Inventors: Toshimichi Tokunaga; Seita Kanai, both of Hiroshima, Japan

[73] Assignee: Mazda Motor Corporation, Hiroshima, Japan

[21] Appl. No.: 583,646

[22] Filed: Feb. 27, 1984

[30] Foreign Application Priority Data

Feb. 28, 1983 [JP] Japan .................................. 58-33029
Mar. 15, 1983 [JP] Japan .................................. 58-43833

[51] Int. Cl.⁴ .............................................. B60G 11/26
[52] U.S. Cl. ...................................... 280/707; 280/703
[58] Field of Search ............... 280/707, 708, 710, 711, 280/712, 714, 702, 703; 188/285, 299, 319; 267/34, 64.21, 64.24, 64.25, 64.27

[56] References Cited

U.S. PATENT DOCUMENTS 3,603,612 9/1971 Hill et al. .............................. 280/707
3,608,925 9/1971 Murphy ................................ 280/707
3,992,039 11/1976 Hiruma ................................ 280/708
4,468,739 8/1984 Woods et al. ........................ 280/707

FOREIGN PATENT DOCUMENTS 55-109008 7/1980 Japan .

*Primary Examiner*—John J. Love
*Assistant Examiner*—Ross Weaver
*Attorney, Agent, or Firm*—Fleit, Jacobson, Cohn & Price

[57] ABSTRACT

A vehicle suspension system having suspension mechanisms including damping struts of variable damping rates and air springs of variable spring coefficients so that the suspension characteristics are changed between the "hard" and "soft" modes. A control circuit is provided for producing a control signal when the engine power output is substantially greater than the engine load to change the suspension characteristics into the "hard" mode. The arrangement is effective to prevent a rearward pitching of the vehicle in start or rapid acceleration.

8 Claims, 10 Drawing Figures

VEHICLE SUSPENSION MEANS HAVING VARIABLE SUSPENSION CHARACTERISTICS

The present invention relates to a vehicle suspension mechanism and more particularly to a vehicle suspension mechanism of variable characteristics. More specifically, the present invention pertains to the control of such vehicle suspension mechanism of variable characteristics.

In automobile industries, it has already been proposed to provide suspension mechanisms of variable characteristics wherein the spring coefficients of suspension springs and/or the damping rates of damper assemblies are made variable and controlled in accordance with the vehicle operating conditions. For example, in Japanese utility model application 54-8394 filed on Jan. 25, 1979 and published for public inspection under the utility model disclosure number of 55-109008 on July 30, 1980, there is proposed to provide a four-wheeled vehicle with suspension mechanisms having dampers of variable characteristics. According to the proposal in the utility model, the damping rates of the dampers in the rear suspension mechanisms are made lower than those in the front suspension mechanisms a high speed operation to give the vehicle an understeer property, and an opposite control is made at low speed operation so that a substantially neutral or oversteer property is provided. The proposed control is described as being advantageous in simultaneously accomplishing stability at high speed operation and a good steerability under a low speed operation.

It should however be noted that in order to generally improve the drivability and the driving comfort in an automobile, it is insufficient to change the characteristics of the suspension mechanisms simply in accordance with the vehicle speed. For example, in vehicle start or in rapid acceleration, the inertia force acts on the vehicle body to produce a rearward pitching movement, however, the control as proposed by the utility model does not prevent such a movement.

It is therefore an object of the present invention to provide a vehicle suspension mechanism which can prevent the aforementioned rearward pitching under a vehicle start and rapid acceleration.

Another object of the present invention is to provide a vehicle suspension mechanism with control means for controlling the suspension characteristics during vehicle start and under a rapid control so that the rearward pitching can be prevented.

A further object of the present invention is to provide a vehicle suspension mechanism of variable characteristics wherein the suspension characteristics are controlled in accordance with the vehicle speed and the engine load.

According to the present invention, the above and other objects can be accomplished by a suspension system for motor vehicles comprising suspension means having suspension characteristics which are variable between hard and soft modes, adjusting means for changing the suspension characteristics of the suspension means, vehicle speed detecting means for detecting vehicle speed and producing a vehicle speed signal, engine power output level detecting means for detecting engine power output level and producing an engine output signal, control means connected with said vehicle speed detecting means and said engine output detecting means to receive said signals therefrom to detect a vehicle operating range wherein engine output is substantially larger than engine load and produce a control signal which is applied to said adjusting means so that the suspension means is adjusted into the hard mode under the said vehicle operating range. The engine power output level may be detected in terms of the amount of actuation of an engine power output control member, such as a throttle valve control member. It is of course possible to detect the position of the engine throttle valve directly. Alternatively, the engine power output level may be detected in terms of the engine intake gas flow or the intake suction pressure. Further, the engine output may even be calculated from the engine speed and the vehicle speed. The term "engine load" herein used is intended to mean the force power required for maintaining steady operation of a vehicle on a horizontal straight path during standard weather conditions.

According to a specific feature of the present invention, the aforementioned vehicle operating range includes a first region wherein the vehicle speed is lower than a first predetermined value and a second region wherein the vehicle speed is between the first predetermined value and a second predetermined value which is higher than said first predetermined value, but the engine output is higher than a third predetermined value. By determining the vehicle operating range in this way, it becomes possible to provide the control means by a simple analogue circuits. In a case where the control means is provided by a microprocessor, it may include a memory map in which the aforementioned vehicle operating range is memorized.

In the vehicle operating range wherein the engine output is substantially larger than the engine load, the vehicle is accelerated so that there is a possibility that the vehicle body is rearwardly pitched. However, according to the present invention, the suspension means is adjusted to the hard mode so that the rearward pitching can be prevented or suppressed.

The above and other objects and features of the present invention will become apparent from the following descriptions of preferred embodiments taking reference to the accompanying drawings, in which.

Figure 1:
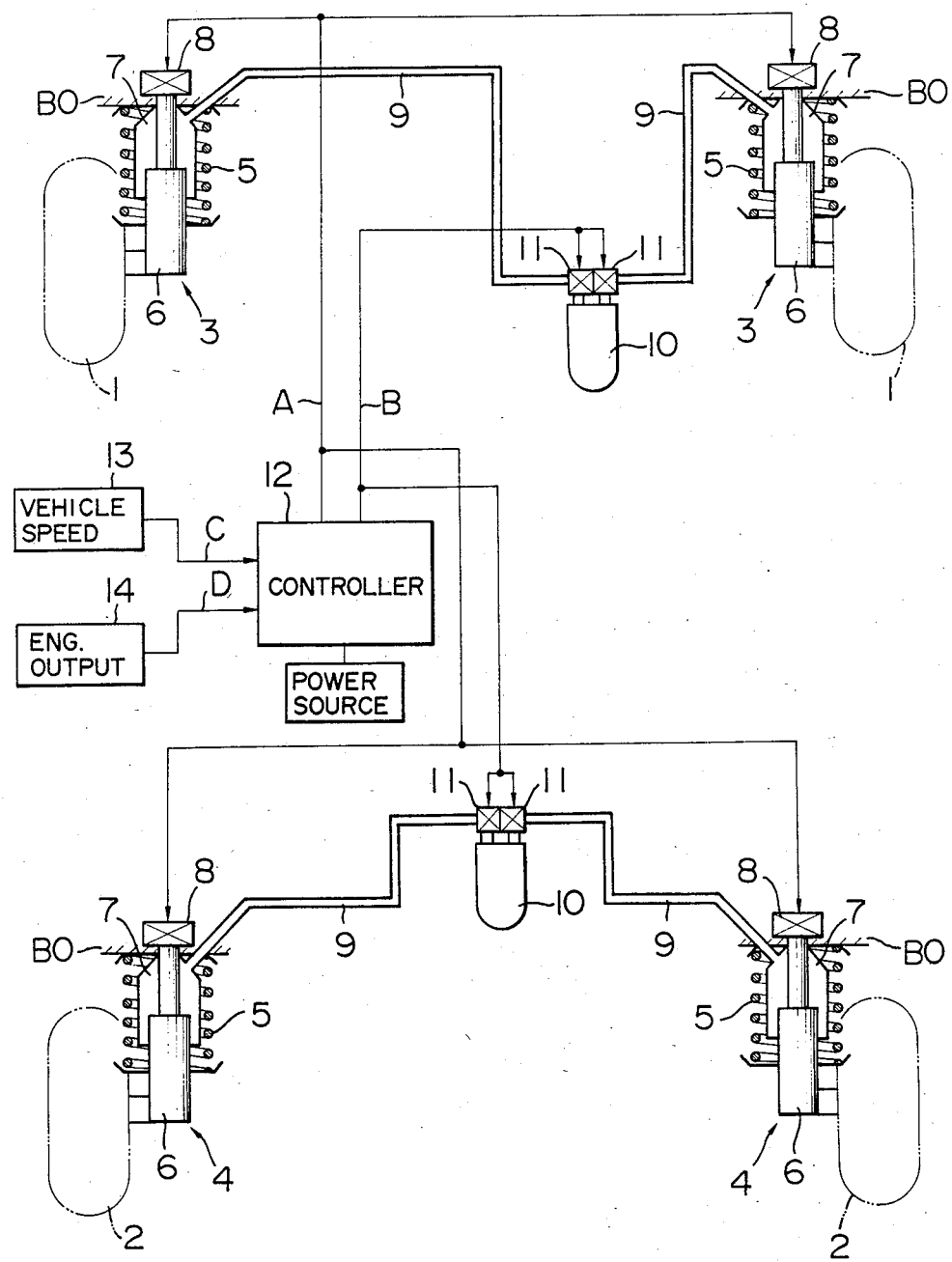
FIG. 1 is a diagrammatical view of a vehicle suspension system to which the present invention can be applied.

Referring now to the drawings, particularly to FIG. 1, there is shown a vehicle suspension system including suspension mechanisms 3 and 4 supporting a vehicle body B respectively on front wheels 1 and rear wheels 2. Each of the suspension mechanisms 3 and 4 is comprised of a coil spring 5, an oleo type damping strut 6 and an air chamber 7. The damping strut 6 is of a variable damping rate and there is provided a step motor 8 for changing the damping rate. The air chamber 7 is connected through a pipe 9 having a solenoid valve 11 with an air tank 10. There is also provided an electric controller 12 for supplying driving currents A and B respectively to the step motors 8 and the solenoid valves 11. The vehicle is provided with a vehicle speed detector 13 and an engine output detector 14, and the outputs C and D of these detectors 13 and 14 are applied to the controller 12. The engine output detector 14 may be a detector for detecting the position of the engine throttle valve or a throttle valve actuating member. Alternatively, the engine output may be detected in terms of the engine intake gas flow.

Figure 2:
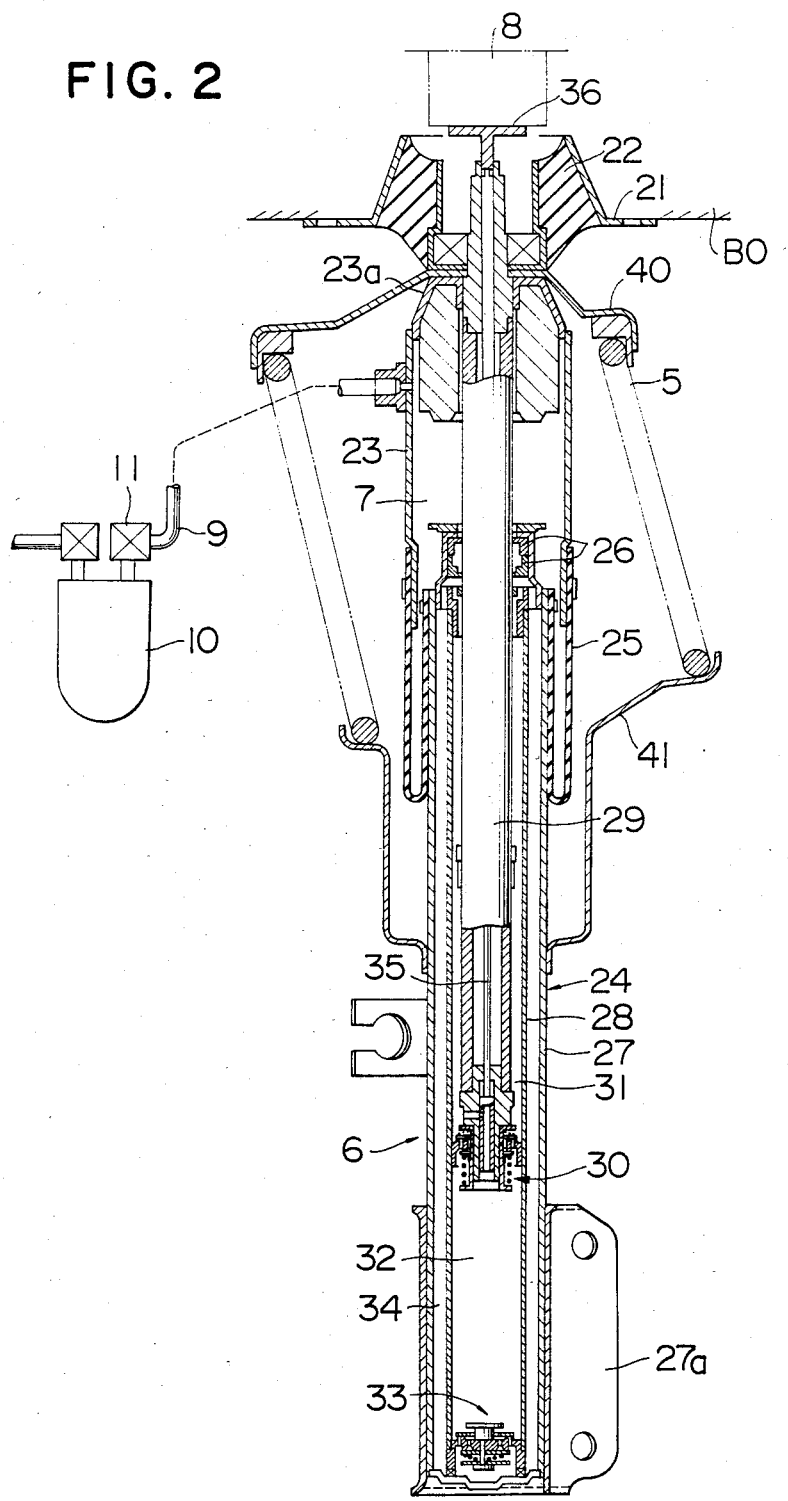
FIG. 2 is a sectional view of a suspension strut assembly which can be adopted in the suspension system shown in FIG. 1.

Referring now to FIG. 2, it will be noted that the damping strut 6 includes a lower cylinder assembly 24 comprised of an outer cylinder 27 and an inner cylinder 28, and a piston rod 29 is axially slidably inserted into the inner cylinder 28. The piston rod 29 is provided at the lower end with a main valve assembly 30 which divides the inside of the inner cylinder 28 into an upper oil chamber 31 and a lower oil chamber 32. Between the outer cylinder 27 and the inner cylinder 28, there is formed a reservoir chamber 34. At the lower end of the inner cylinder 28, there is a bottom valve 33 for allowing hydraulic oil to flow from the chamber 34 into the lower chamber 32. At the lower end of the outer cylinder 27, there is provided a bracket 27a which is adapted for connection with a wheel carrier for rotatably carrying each of the wheels 1 and 2.

At the upper portion of the lower cylinder assembly 24, there is an upper cylinder 23 which has a lower end portion encircling the upper end portion of the outer cylinder 27. The lower end of the upper cylinder 23 and the upper end of the outer cylinder 27 are connected by a rolling diaphragm 25. The piston rod 29 extends upwards beyond the upper end of the lower cylinder assembly 24 through a seal member 26 provided at the upper end of the outer cylinder 27. The piston rod 29 is secured at the upper end to a cap member 23a provided at the upper end of the upper cylinder 23 so that the aforementioned air chamber 7 is defined in the upper cylinder 23. The upper cylinder 23 carries an upper spring seat 40 at the upper end thereof whereas the outer cylinder 27 has a lower spring seat 41, and the aforementioned coil spring 5 is positioned to work between the spring seat 40 and 41. The upper spring seat 40 is connected through a rubber cushion 22 and a bracket 21 with the vehicle body B.

Figure 3:
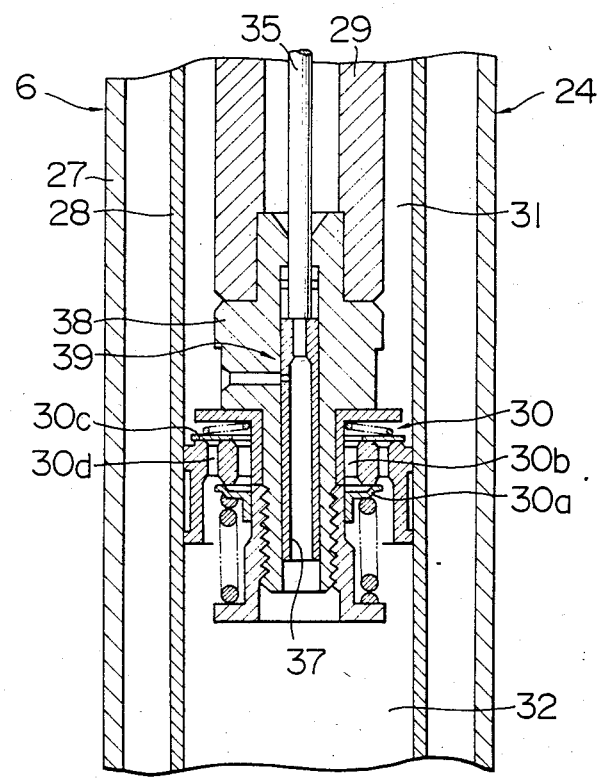
FIG. 3 is an enlarged sectional view of the suspension strut assembly particularly showing the mechanism for changing the damping rate.

As shown in FIG. 3, the main valve 30 includes a valve body formed with first orifices 30b provided with a check valve 30a which allows hydraulic fluid flow from the upper chamber 31 to the lower chamber 32 when the strut 6 is being extended, and second orifices 30d provided with a check valve 30c which allows hydraulic fluid flow from the lower chamber 32 to the upper chamber 31. Due to the flow restrictions provided by the orifices 30b and 30d, it is possible to obtain a vibration damping property.

Figure 4:
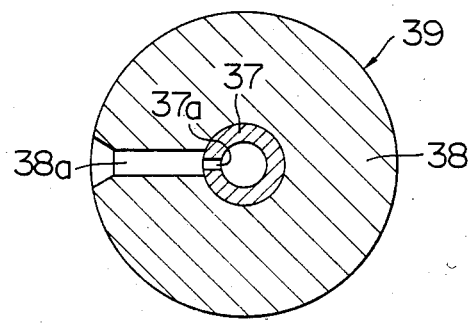
FIG. 4 is a cross-sectional view of the mechanism shown in FIG. 3.

The piston rod 29 is of a hollow tubular form and an elongated control rod 35 is inserted through the piston rod 29. The control rod 35 is connected at the upper end with a driving key 36 provided at the output shaft of the step motor 8 to be driven thereby. At the lower end of the control rod 35, there is provided a tubular valve member 37 which is fitted in a valve case 38 secured to the lower end of the piston rod 29. The valve member 37 and the valve case 38 constitute an orifice valve 39 which includes a radially extending orifice 37a formed in the tubular valve member 37 and a radially extending oil passage 38a formed in the valve case 38 as shown in FIG. 4. The radially outer end of the passage 38a is opened to the upper chamber 31 whereas the lower end of the tubular valve member 37 is opened to the lower chamber 32 so that the communication between the chambers 31 and 32 through the orifice 37a can be controlled by rotating the control rod 35. When the communication through the orifice 37a is interrupted, the damping rate is increased so that the suspension mechanism assumes a "hard" mode. However, when the upper and lower chambers 31 and 32 are communicated through the orifice 37a, the damping rate is decreased and the suspension mechanism assumes a "soft" mode. It should further be noted that by closing the solenoid valve 11 the suspension characteristics is made "hard" but, by opening the solenoid valve 11, it is possible to obtain a "soft" characteristics.

Figure 5:
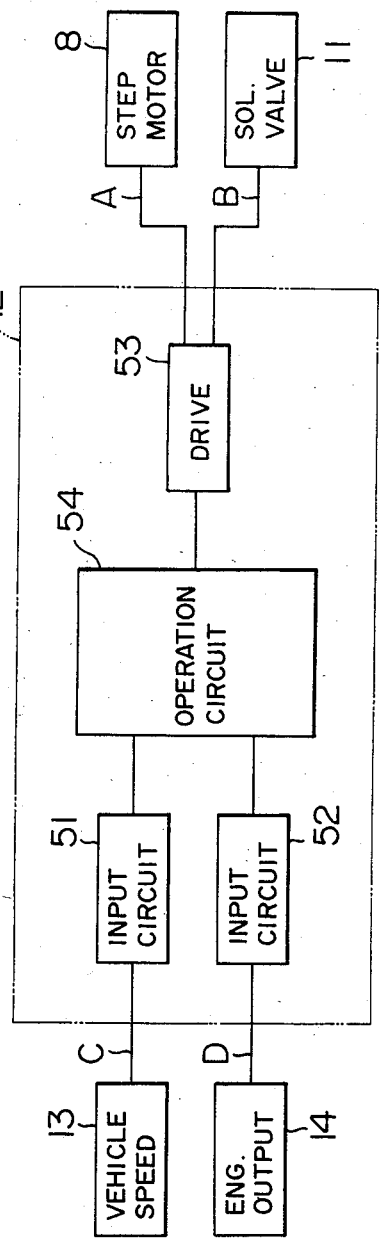
FIG. 5 is a circuit block diagram showing one example of the control circuit for controlling the suspension system.
Figure 7:
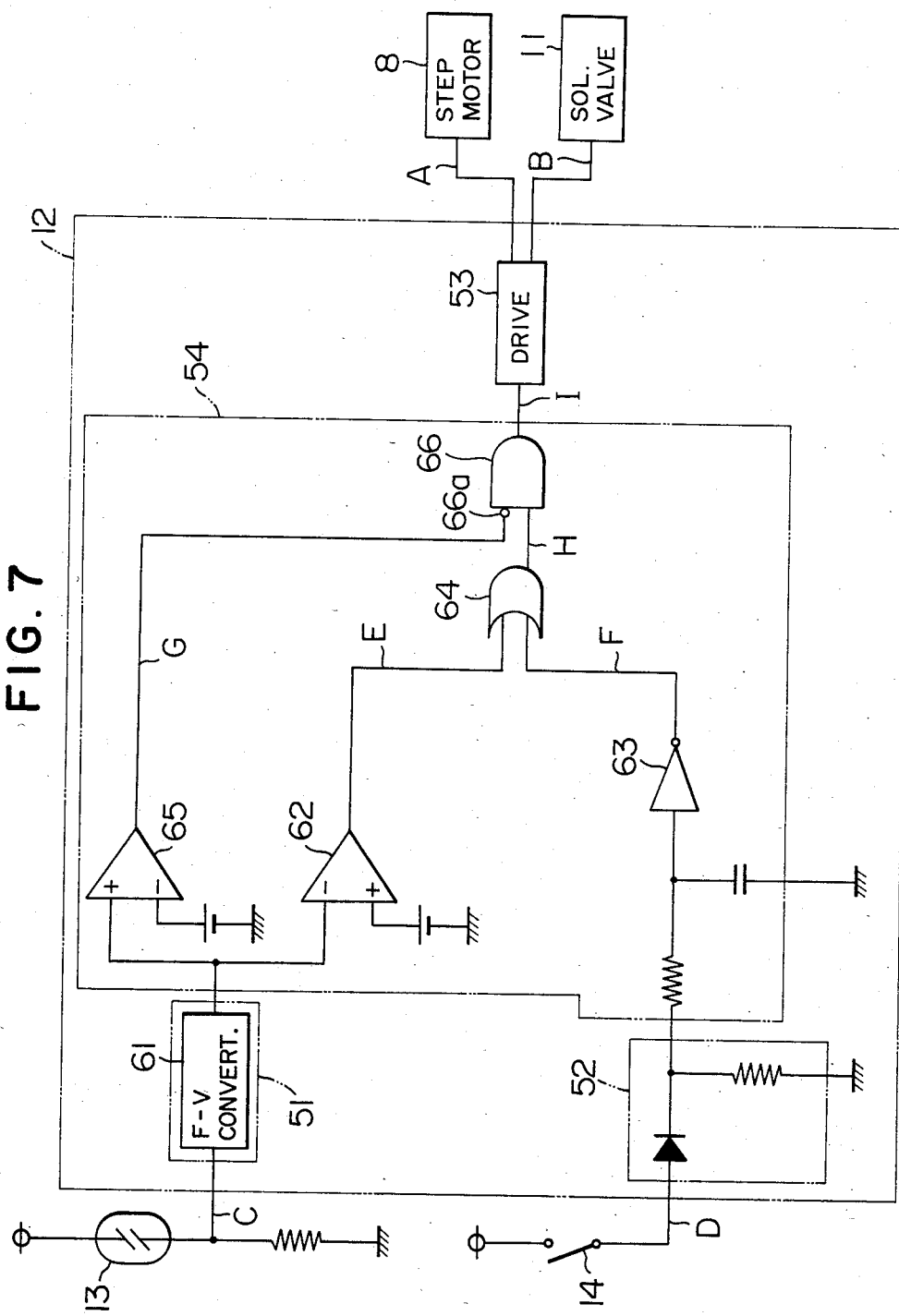
FIG. 7 is a circuit diagram showing the details of the control circuit shown in FIG. 5.

Referring now to FIG. 5, the controller 12 comprises input circuits 51 and 52 respectively connected with the speed detector 13 and the engine output detector 14. The input circuits 51 and 52 have outputs connected with an operation circuit 54 which is in turn connected with a driving circuit 53. Referring to FIG. 7, it will be noted that the input circuit 51 is constituted by a frequency-voltage (F-V) converter 61 which receives a speed signal C from the speed detector 13 which is of a reed switch type in this case. The detector 13 produces pulse signals representing the vehicle speed and the signals are converted into a voltage signal by the F-V converter 61. The output of the F-V converter 61 is connected on one hand with a negative input terminal of a low speed comparator 62 and on the other hand with a positive input terminal of a high speed comparator 65. The low speed comparator 62 has a positive input terminal which is connected with a reference voltage. The high speed comparator 65 has a negative input terminal connected with a reference voltage.

Figure 6:
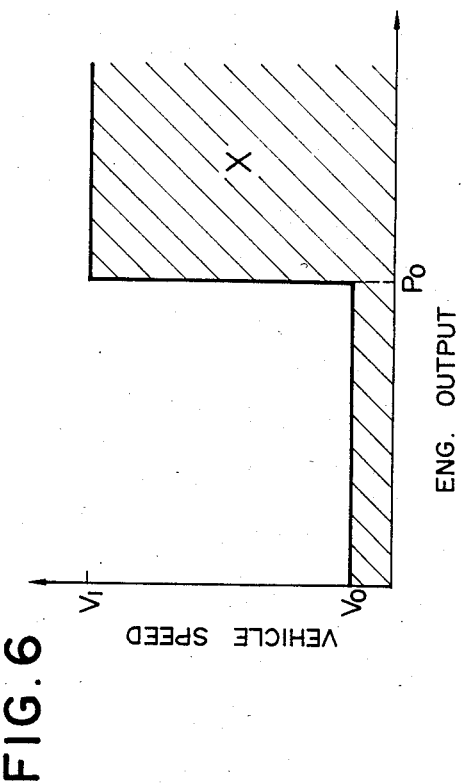
FIG. 6 is a diagram showing the vehicle operating range in which the hard mode is selected.

The engine power output level detector 14, in this embodiment is constituted by a position switch which is opened when the engine throttle valve or throttle valve actuating member is operated beyond a predetermined position. The output from the detector 14 is applied through the input circuit 52 to an inverter 63 which produces a high level signal F when the detector switch 14 is opened or when the engine power output level is greater than a predetermined value, for example, the value Po as shown in FIG. 6. The output F of the inverter 63 is applied to one of input terminals of an OR circuit 64.

The low speed comparator 62 produces a high level signal E when the vehicle speed is lower than a predetermined value, for example, the value Vo as shown in FIG. 6. The output of the comparator 62 is connected to the other of the input terminals of the OR circuit 64 so that the OR circuit 64 produces a high level signal H when the vehicle speed is lower than the value Vo and/or the engine output is higher than the valve Po.

The output of the OR circuit 64 is applied to one of the input terminals of an AND circuit 66. The high speed comparator 65 produces a high level signal when the vehicle speed is higher than a second predetermined value, for example, the value V, which is higher than the first value $V_1$. The output G of the high speed comparator 65 is applied to the other of the AND circuit 66 through an inverter 66a so that the AND circuit 66 produces a high level signal when a high level signal is produced by the OR circuit and the vehicle speed is lower than the value $V_1$. Thus, a high level signal is produced by the AND circuit 66 when the vehicle operating condition is in the shadowed area X in FIG. 6. The output of the AND circuit 66 is applied to the driving circuit 53 which produces outputs A and B for operating the step motors 8 and the solenoid valves 11.

In operation, when the vehicle is being started, the vehicle speed is lower than the value Vo so that the operation circuit 54 of the controller 12 detects that the operating condition is in the shadowed area X in FIG. 6 to apply energizing currents A, B to the step motors 8 and the solenoid valves 11. Thus, the valve members 37 in the orifice valve 39 is rotated through the control rod 35 from the position shown in FIG. 4 to a position wherein the orifice 37a in the valve member 37 is disconnected from the passage 38a in the valve case 38. At the same time, the solenoid valves 11 are closed. Therefore, the suspension mechanisms takes the "hard" mode, so that it is possible to prevent a rearward pitching which may otherewise occur during the vehicle start. This mode is maintained as long as the vehicle speed is lower than the value Vo. When the vehicle speed exceeds the value Vo with the engine output lower than the value Po, the step motors 8 are operated to the position wherein the orifice 37a in the valve member 37 is communicated with the passage 38a in the valve case 38. Further, the solenoid valves 11 are opened. Thus, the suspension mechanisms are returned to the "soft" mode.

When the vehicle is running, if it is found that the engine output is greater than the value Po but the vehicle speed is lower than the value $V_1$, the controller 12 adjudges that the engine output is substantially greater than the engine load so that there is sufficient power to accelerate the vehicle. Then, the controller 12 produces output currents A and B for energizing again the step motors 8 and the solenoid valves 11 to change the suspension mechanisms into the "hard" mode.

In an operating condition wherein the engine output is greater than the value Po but the vehicle speed is greater than the value $V_1$, it is judged that the engine output is not substantially greater than the engine load. Thus, in this operating condition, the controller 12 does not produce the driving currents A and B so that the suspension mechanisms are maintained in the "soft" mode. As an example, the engine output value Po may be that corresponding to the throttle valve opening of $\frac{7}{8}$ of the full opening. The vehicle speed Vo may be 4 km/h whereas the vehicle speed $V_1$ may be 60 km/h.

Figure 8:
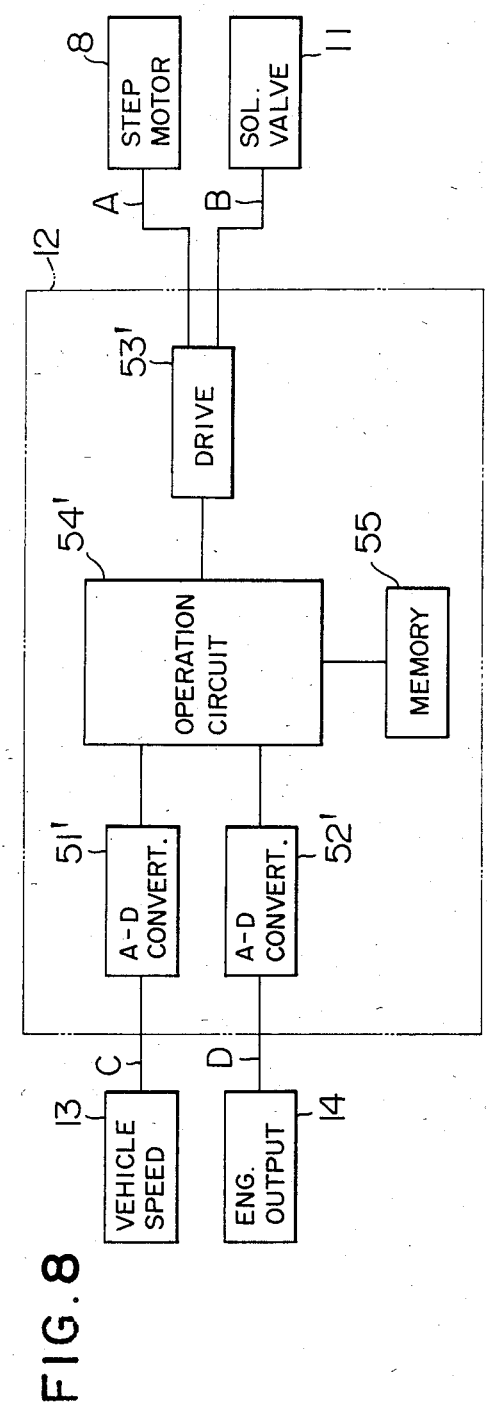
FIG. 8 is a circuit block diagram showing another example of the control circuit.
Figure 9:
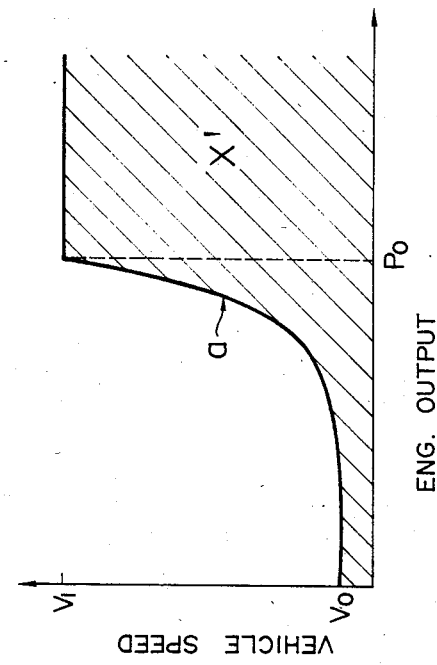
FIG. 9 is a diagram showing another example of determining the vehicle operating range in which the hard mode is selected; and, FIG. 10 is a program flow chart showing the suspension control in the embodiment shown in FIG. 8.

Referring now to FIG. 8, the controller 12 shown therein includes analogue-digital (A–D) converters 51' and 52' which are respectively connected with the vehicle speed detector 13 and the engine output detector 14 to receive analogue output signals C and D therefrom. The A–D converters 51' and 52' converts the analogue signals C and D from the detectors 13 and 14 into digital signals which are applied to an operation circuit 54' which may be a microprocessor having a memory 55. The output of the operation circuit 54' is connected with a driving circuit 53' which produces driving current A and B for energizing the step motors 8 and the solenoid valves 11. The memory 55 has a memory map as shown by a curve a in FIG. 9. In the memory map, the shadowed area X' defined by the curve a is the region wherein the engine output is substantially larger than the engine load. As in the previous embodiment, the area X' is limited below the vehicle speed $V_1$ since there will be little possibility of the vehicle being rapidly accelerated.

Figure 10:
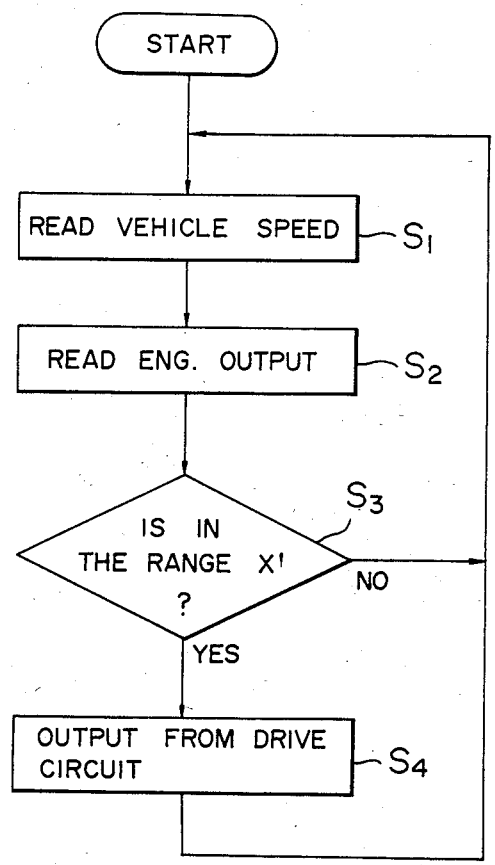

FIG. 10 shows a program flow chart of the operation circuit 54'. In the steps $S_1$ and $S_1$, the vehicle speed signal from the A–D converter 51' and the engine output signal from the A–D converter 52' are read and a judgement is made in the step $S_3$ as to whether the vehicle operating condition is in the region X'. Where it is judged that the vehicle operating condition is in the region X', the operation circuit 54' produces an output which is applied to the driving circuit 53' so as to make the driving circuit produce driving currents A and B. Thus, the suspension mechanisms assume the "hard mode". If it is judged that the vehicle operating condition is out of the region X', the driving currents A and B are not produced and the programmed procedure is repeated.

In the embodiments described above, the properties of the damping struts 6 and the air springs 7 are simultaneously adjusted to change the suspension characteristics between the "hard" and "soft" modes. However, only one of the properties may be adjusted to accomplish the same or similar results.

The invention has thus been shown and described with reference to specific embodiments, however, it should be noted that the invention is in no way limited to the details of the illustrated arrangements but changes and modifications may be made without departing from the scope of the appended claims.

We claim:

1. A suspension system for motor vehicles comprising suspension means having suspension characteristics which are variable between hard and soft modes, adjusting means for changing the suspension characteristics of the suspension means, vehicle speed detecting means for detecting vehicle speed and producing a vehicle speed signal, engine power output level detecting means for detecting engine power output level and producing an engine power output level signal, control means connected with said vehicle speed detecting means and said engine output detecting means to receive said signal therefrom to detect a vehicle operating range wherein engine output is substantially larger than the output necessary to maintain constant speed vehicle operation and to produce a control signal which is applied to said adjusting means to adjust the suspension means into the hard mode when the vehicle is within said vehicle operating range.

2. A vehicle suspension system in accordance with claim 1 in which said control means includes means for detecting said vehicle operating range by detecting a first region wherein the vehicle speed is lower than a first predetermined speed value, and a second region wherein the vehicle speed is between the first predetermined speed value and a second predetermined speed value which is higher than said first predetermined speed value and the engine power output level is higher than a predetermined output value.

3. A vehicle suspension system in accordance with claim 1 in which said suspension means includes oleo type damping strut means having a variable damping rate and said adjusting means includes means for changing the damping rate of the strut means.

4. A vehicle suspension system in accordance with claim 1 in which said suspension means includes air spring means having a variable spring coefficient and said adjusting means includes means for changing the spring coefficient of the air spring means.

5. A vehicle suspension system in accordance with claim 1 in which all of which wheels are provided with said suspension means and said control means is arranged to apply the control signal to the adjusting means of the suspension means associated with all of the wheels.

6. A vehicle suspension system in accordance with claim 1 in which said control means includes memory means having a map defining said vehicle operating range and means for reading the map in accordance with the signal from the detecting means to detect that vehicle operation is in said range.

7. A vehicle suspension system in accordance with claim 1 in which said control means includes first means for detecting a first vehicle operation region wherein the vehicle speed is below a first predetermined value, second means for detecting a second vehicle operation region wherein the vehicle speed is below a second predetermined value which is higher than the first predetermined value and wherein the engine power output level is above a predetermined output value, and means for producing said control signal when at least one of said first and second means detects their respective regions.

8. A suspension system for motor vehicles comprising suspension means having suspension characteristics which are variable between hard and soft modes, adjusting means for changing the suspension characteristics of the suspension means, vehicle speed detecting means for detecting vehicle speed and producing a vehicle speed signal, engine power output level detecting means for detecting engine power output level and producing an engine power output level signal, control means connected with said vehicle speed detecting means and said engine power output level detecting means to receive said signals therefrom to detect a first vehicle operating range wherein the vehicle speed is lower than a first predetermined speed value and a second vehicle operating range wherein the vehicle speed is lower than a second predetermined speed value which is higher than the first predetermined speed value and the engine power output level is higher than a predetermined power output value, and to produce a control signal which is applied to said adjusting means to adjust the suspension means into the hard mode under the said first and second vehicle operating ranges.

* * * * *